Dec. 11, 1923.

B. V. McQUINN 1,476,993

ATTACHMENT FOR VEHICLES

Filed April 14, 1922

B. V. McQuinn
INVENTOR

BY Victor J. Evans
ATTORNEY

WITNESS:

Dec. 11, 1923.
B. V. McQUINN
1,476,993
ATTACHMENT FOR VEHICLES
Filed April 14, 1922    2 Sheets-Sheet 2
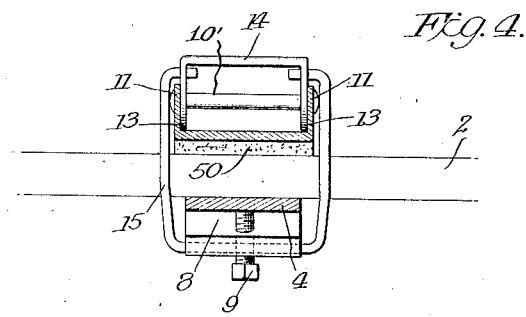
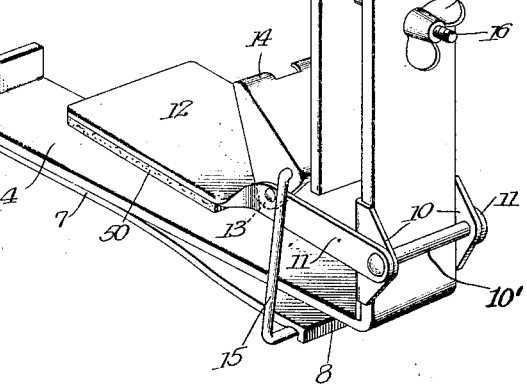
B. V. McQuinn
INVENTOR
BY Victor J. Evans
ATTORNEY Patented Dec. 11, 1923.

1,476,993

UNITED STATES PATENT OFFICE.

BARTHOLOMEW VINCENT McQUINN, OF CAMERON, MISSOURI.

ATTACHMENT FOR VEHICLES.

Application filed April 14, 1922. Serial No. 552,587.

*To all whom it may concern:*

Be it known that I, BARTHOLOMEW V. MC-QUINN, a citizen of the United States, residing at Cameron, in the county of Clinton and State of Missouri, have invented new and useful Improvements in Attachments for Vehicles, of which the following is a specification.

My present invention has reference to a means whereby tent poles, and tent and camp equipment may be conveniently carried on the running board of an automobile.

A further object is to provide an attachment for the running board of automobiles in which clamps of a novel construction are employed and which are removably secured to the running board and which support therebetween, in a novel and effective manner, tent poles which provide the outer edge of the running board with an upstanding frame and convert the running board into a bundle carrier, for the canvas of the tent and for camp equipment.

It is also my purpose to produce a device of this character which can be easily attached to the running board, readily removed therefrom and which shall be of a collapsible nature so that the same can be folded into a small package easily and conveniently arranged in the car, when not in use.

The foregoing, and other objects which will appear as the nature of the invention is better understood, may be accomplished by a construction, combination and operative association of parts, such as is disclosed by the drawings which accompany and which form part of this specification.

In the drawings:

Figure 4 is a sectional view on the line 4—4 of Figure 3.

Figure 5 is a perspective view of one of the bracket members or clamps showing the swinging jaw thereof in open position.

Figure 1:
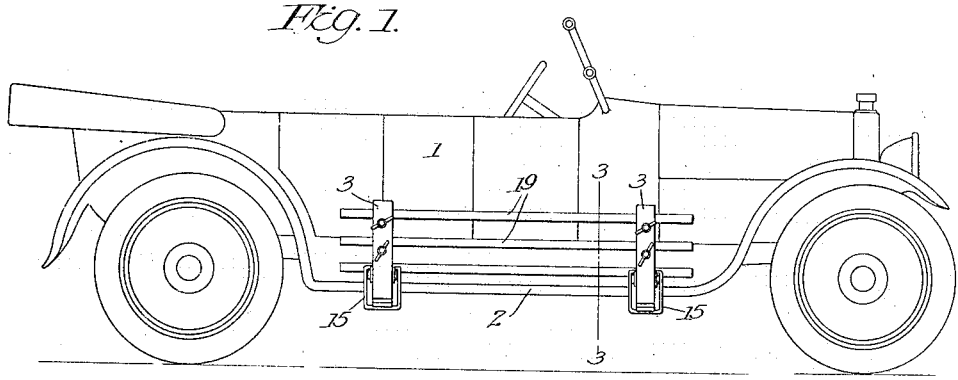
Figure 1 is a side elevation of an automobile provided with the improvement.
Figure 2:
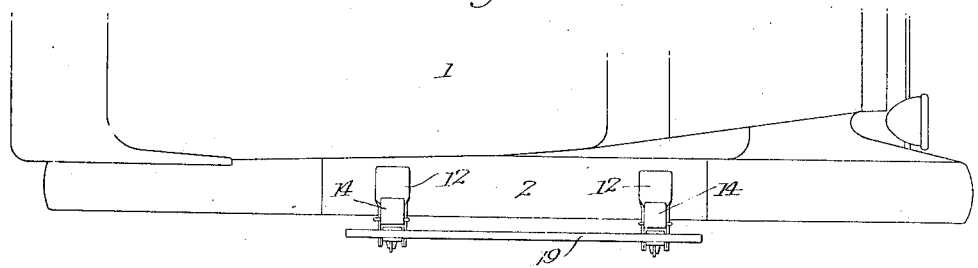
Figure 2 is a top plan view thereof.
Figure 3:
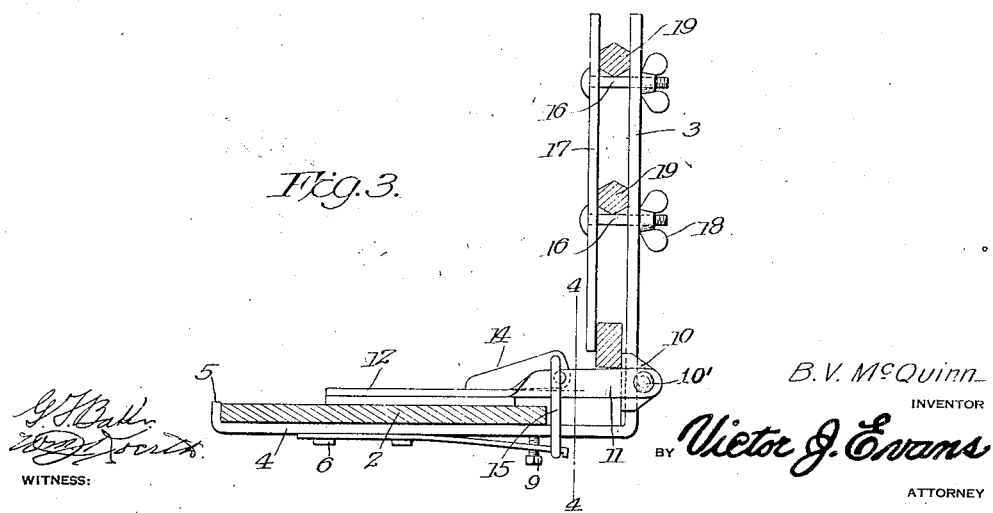
Figure 3 is a sectional view on the line 3—3 of Figure 1.

My improvement is primarily designed for use by automobile tourists and will be so described, but it is to be understood that the invention is not thus necessarily restricted, as slats instead of tent poles may be clamped on the running board of a machine and my device employed as a carrier for bundles or the like.

In the drawings, the numeral 1 designates a sufficient portion of an ordinary automobile to illustrate the application of the improvement. The running board of the automobile is indicated by the numeral 2.

My improvement essentially comprises a pair of L-shaped brackets. As both of the brackets are similarly constructed, a description of one and the reference character applied thereto may be considered applicable to the other. The vertical arm of each bracket is indicated by the numeral 3, the horizontal arm by the numeral 4. Each horizontal arm has its free end formed with an upwardly directed lip 5. Secured, by means 6 on the under face of the horizontal arm of each bracket there is the straight end 7 of a downwardly inclined flat spring 8. Each spring may have its outer end formed with a downwardly directed lip, and each spring 8 is provided with a threaded opening that receives therethrough a bolt member 9, the said bolt contacting with the under face of the arm 4 adjusting the angle end of the spring 8 with respect to the said arm of the bracket.

On the outer angle arm 3 of each bracket, adjacent the lower horizontal arm there are outwardly directed ears 10, and straddling these ears are the arms 11 formed on the bifurcated end of a jaw member 12. A pivot 10' passes through the arms 11 and through the ears 10. Designed to rest on the upper face of each jaw 12 is the cam end 13 of a dog 14. The dog 14 is substantially V-shaped in plan, the cam end 13 being provided on one of the corners at the widened end of the said dog, and passing through the dog at the opposite corner of the said widened end there is one end of a bail 15, the opposite end of the bail being received on the under face of the angle end 8 of the spring.

It will be apparent that by swinging the dog 14 to bring its under angle face into contact with the outer flat face of the jaw 12, the said jaw will be swung toward the arm 4.

The arm 4 is arranged beneath the running board 2 of the automobile 1, the jaw 12 being arranged thereover. By thus operating the dog an effective clamping engagement will result between the dog 12, the running board and the arm 4 of the bracket.

The outer member or arm 3 of each bracket has spaced openings therethrough, and through these openings there are passed adjustable elements 16 respectively. The elements have headed ends and the said elements also pass through plates 17, the heads of the elements contacting with the outer faces of the said plates. The elements 16 may be in the nature of ordinary bolts, and the threaded ends thereof which extend through the members 3 of the brackets may have screwed thereon nuts 18. Between the arms 3 and the plates 7 there are arranged the upright and ridge poles 19 of a tent, the said poles being compressed between the said elements by adjusting the nuts on the bolts.

From the foregoing description, when taken in connection with the drawings it will be noted that I have produced an extremely simple, cheap and thoroughly effective device for the purpose intended. It will be seen that the brackets can be easily and quickly clamped on the running board and as readily removed therefrom. Any desired number of poles or slats 19 may be employed, and should it be found desirable, the said slats may rest on the bolts 16. The springs 8 effectively hold the dogs in locking position, the bolts 9 being primarily devised for holding the dog against movement when swung to active position, these bolts may be further adjusted to cause the ends thereof to contact with the under faces of the arms 4 of the brackets to prevent any liability of the spring moving in the direction of the bracket.

On the jaw 12 I rivet a compressible pad 50 to prevent the slipping of the jaw and to prevent injury to the object engaged by the jaw.

I claim :—

1. The combination with an automobile, of a luggage carrier for the running board thereof, comprising angle brackets, means clamping the brackets on the running board, plates laterally adjustable with respect to the vertical arms of the brackets, and members clamped between said plates and arms.

2. The combination with an automobile, of a luggage carrier for the running board thereof, comprising angle brackets, means for clamping the lateral arms of the angle brackets on the running board, locking means for said clamping means, plates laterally adjustable with respect to the vertical arms of the brackets, and members clamped between said plates and arms.

3. The combination with an automobile, of a luggage carrier for the running board thereof, comprising angle brackets, jaw members pivoted to one arm of each bracket and arranged for movement toward the other arm of the bracket, spring means influencing the said jaw toward the said arm, locking means carried by said spring means for engaging said jaw, plates laterally adjustable with respect to the other arms of the brackets, and members clamped between said plates and arms.

4. The combination with an automobile, of a luggage carrier for the running board thereof, comprising angle brackets, the lateral arms of which being arranged beneath the running board, a jaw pivoted to the vertical arm of each bracket for arrangement over the running board, a dog influencing the arm toward the running board, spring means carried by the lateral arm of the bracket supporting dog, plates laterally adjustable with respect to the vertical arms of the brackets, and members clamped between said arms and plates.

5. The combination with an automobile, of a luggage carrier for the running board thereof, comprising angle brackets, whose lateral arms have their ends upturned to provide lips to contact with the inner edge of the running board, when the said arms of the brackets are arranged therebeneath a flat spring secured to the under face of the arm having an outer angled portion, adjustable means carried by the last mentioned portion of the spring for contacting the under face of the arm a jaw pivotally secured to the vertical arm of each bracket above the lateral arm thereof, a dog having a cam surface on the jaw, a yoke member straddling the lateral arm of the bracket and the jaw, pivotally connected to the dog and supported by the spring, a plate laterally adjustable with respect to the vertical arm of each bracket, and members clamped between the plates and said arms of the brackets.

In testimony whereof I affix my signature.

BARTHOLOMEW VINCENT McQUINN.